June 19, 1923.

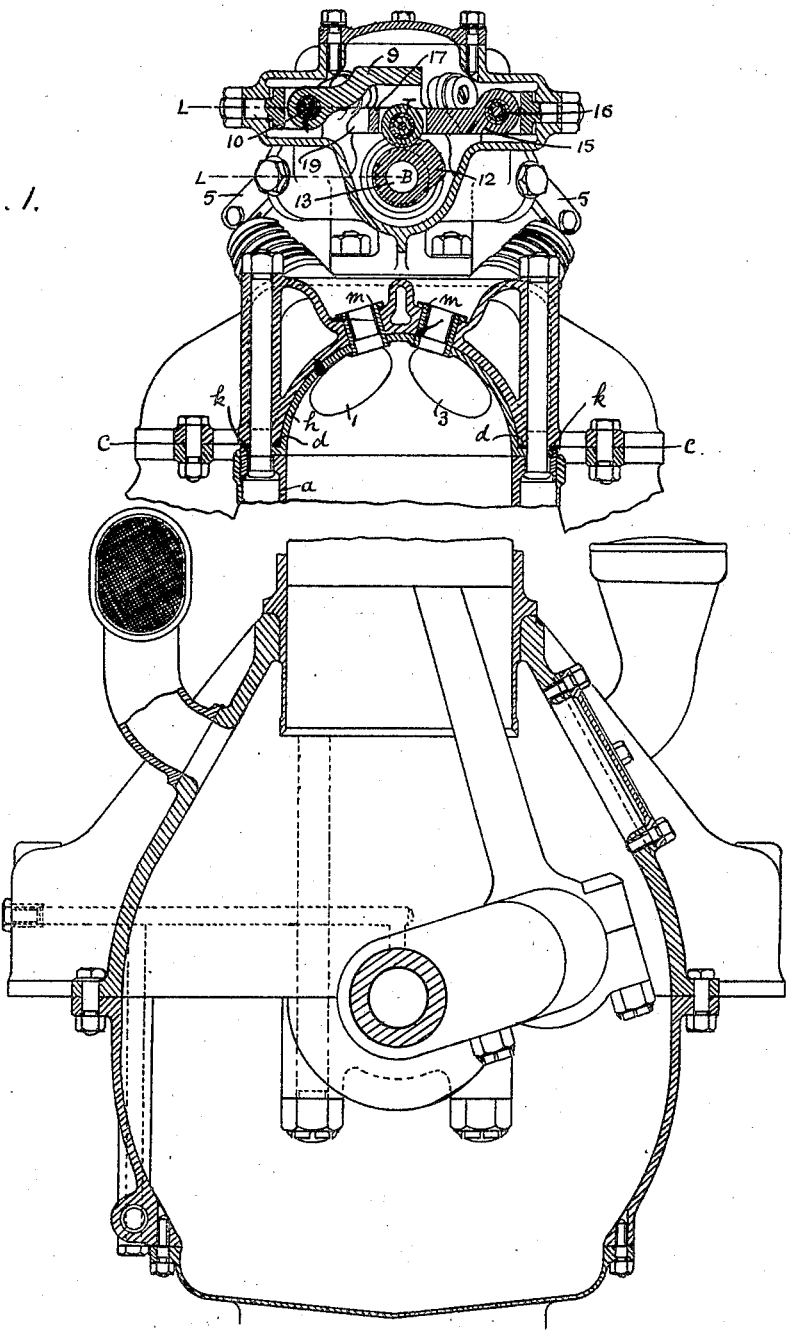

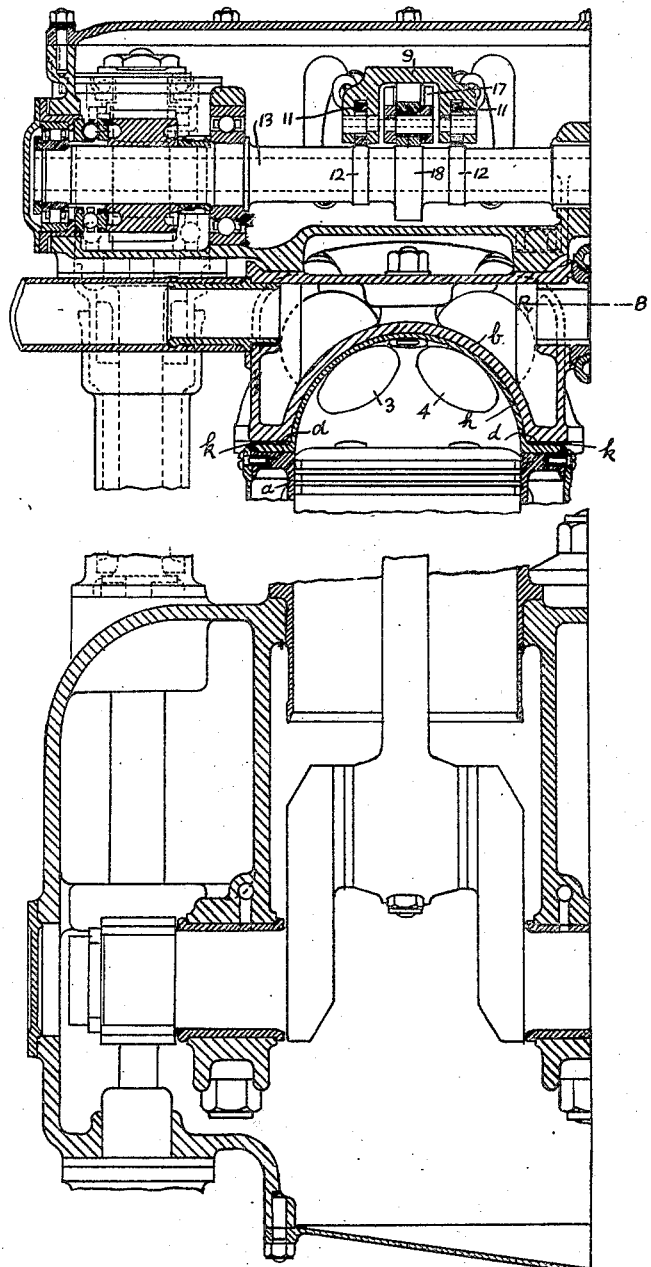

E. LANZEROTTI-SPINA 1,459,630

INTERNAL COMBUSTION ENGINE

Filed July 29, 1919     5 Sheets-Sheet 3

Inventor.
Ettore Lanzerotti-Spina.
per.
Attorney.

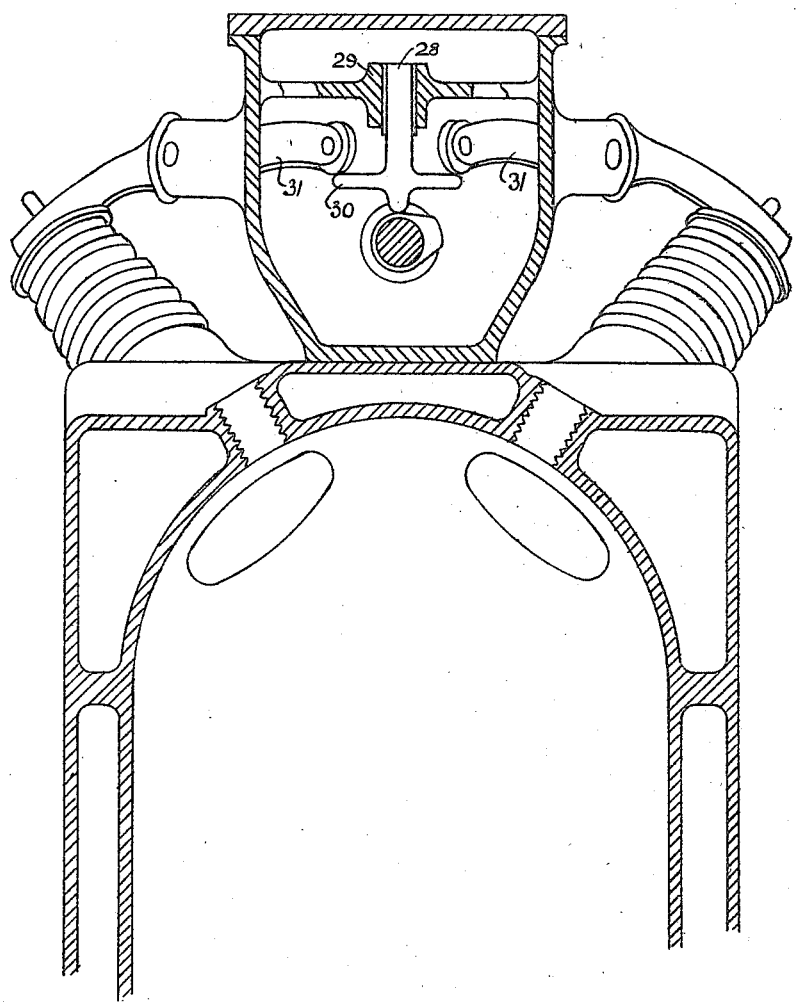

Patented June 19, 1923.

1,459,630

UNITED STATES PATENT OFFICE.

ETTORE LANZEROTTI-SPINA, OF BAYSWATER, LONDON, ENGLAND.

INTERNAL-COMBUSTION ENGINE.

Application filed July 29, 1919. Serial No. 314,106.

*To all whom it may concern:*

Be it known that I, ETTORE LANZEROTTI-SPINA, a subject of the King of Italy, residing at 40 Queens Road, Bayswater, in the county of London, England, have invented new and useful Improvements in Internal-Combustion Engines, of which the following is a specification.

This invention relates to internal combustion engines, and its chief feature is the provision in such engines of a substantially hemispherical combustion chamber.

The stress upon the walls of a chamber of this shape, due to the explosive combustion of gases within it, is uniform over the whole surface, and is unaccompanied by any bending stress such as arises in a cylinder head of arc shape, or one in which pockets are formed. Consequently the necessary thickness of metal is a minimum, which conduces to the production of an engine of light weight, which is one of the purposes of the invention.

Further this shape of chamber exposes to the gases a minimum area of surface for the volume enclosed, so that there is relatively little loss of heat and high thermal efficiency results. At the same time the symmetry and smoothness of the surface afford no possibility of hot spots occurring. The pressure and temperature being thus evenly distributed there is no distortion of the metal, and one common source of leaking valves and consequent loss of compression is avoided.

In order to preserve the smooth hemispherical form the valves, and preferably also the sparking plugs, are set radially in the head. For valves so arranged there is ample space, so that a plurality of inlet and outlet valves may be provided. The large valve area thus obtained ensures the complete filling of the cylinder on the suction stroke, and the absence of back pressure on excitation; which means that the volumetric efficiency of the engine will be high. Moreover this location of valves causes the cool incoming gases to spread over the surface of the chamber, so greatly assisting in cooling it and the exhaust valve surfaces which in fact form part of it.

Other features of the invention, such as the mechanism by which the radially set valve may be operated from a cam shaft are described in detail with reference to the accompanying drawings in which—

Figure 1 is a vertical median section at right angles to the crank shaft, the piston and associated parts not affected by the invention, being shown in elevation.

Figure 2 is a similar view at right angles.

Figures 5 and 6 are vertical median sections of alternatives.

Figure 4:
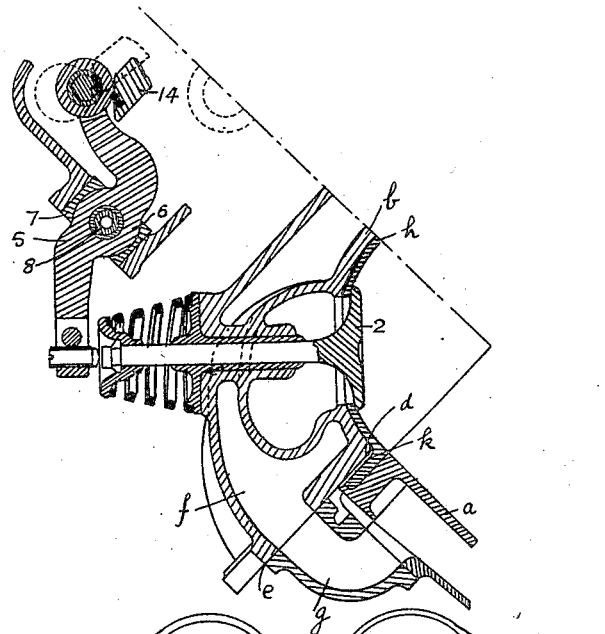
Figure 4 is a half section on the line IV—IV of Figure 3.

In Figures 1 to 4 $a$ is the piston-swept cylinder, $b$ the head, an exact and complete hemisphere. Where, as in this case, and as is preferred, the head is made detachable from the cylinder, it is preferred that the joint faces of the inlet and exhaust port flanges $c$ should be made parallel to the joint $d$ between the cylinder and head. This facilitates the machining of the surfaces, and enables the engine with its radial valves to be made of relatively small overall dimensions. The joint faces of the flanges $e$ (Figure 4) through which connection is made between the water space $f$ of the head and that of the cylinder jacket $g$ may also be made parallel to the joint between cylinder and head.

For ordinary purposes the head may be of iron, but where a specially light engine is desired the body of the head may be of aluminium or some light alloy, and may be fitted with a thin pressed or stamped liner $h$ of steel or the like. Such a liner may also be employed with steel or iron heads for the sake of cheap replacement. On account of the exact hemispherical shape this liner can be made by accurate machining exactly to fit the chamber. To ensure thorough metallic contact between the two, in order that the head conductivity may be good, a layer of jointing metal $k$ may be interposed between the head and liner. Both liner and head may be coated with solder before they are put together, or the liner may be "tinned" placed in a mould, and the head cast upon it. The solder must be suitable to the temperature of casting; and whatever the mode of manufacture the thickness of liner and head should be so designed that the normal temperature gradient through the thickness of the metal will not bring the solder above its melting point.

In the construction shown there are four symmetrically placed valves, two, say 1 and 2, being inlet valves, and the others 3 and 4 exhaust valves. To operate these valves without causing harmful side thrusts on the moving parts, an intermediate member moving at right angles to the cam shaft is interposed between the cam shaft and the valve rocking levers. Each valve has an operating lever 5 rocking in its plane, the form of which is clearly seen in Figure 4. The lever is enlarged at its pivot and formed with a spherical surface 6, which rocks in a spherical bearing 7 secured by a pin 8 which passes freely through the lever.

Figure 3:
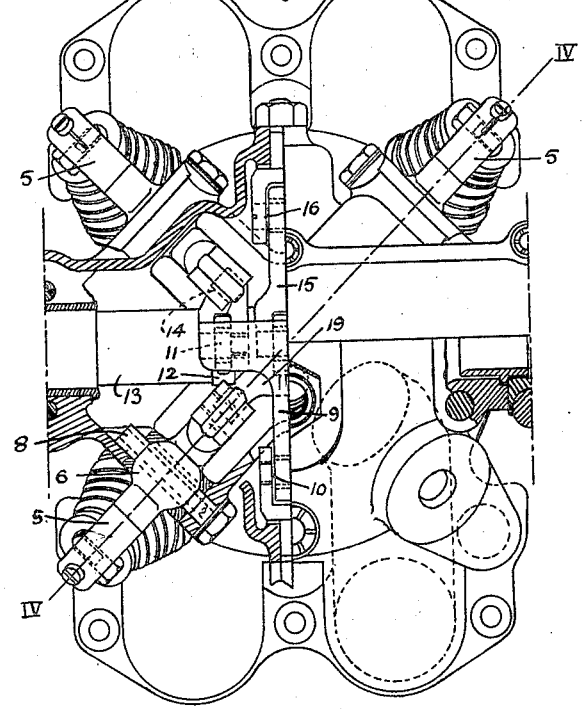
Figure 3 is a plan view, the left hand top part being in section on the line L T of Figure 1, the right hand top part a simple plan with the cover of the cam shaft casing removed, the left hand bottom part a section on the line L B of Figure 1, and the right hand bottom part a plan with the valve removed and a detail in section on the line R R of Figure 2.

There are in this case two intermediate members each in the form of a lever and each operating two valves. One of them is the lever 9 pivoted at 10, forked at its other end and carrying two rollers 11, co-acting with cams 12 on the cam shaft 13. The ends 14 of the fork prongs are suitably shaped, as seen in Figures 3 and 4 and engage the rollers carried by the levers 5 which operate, say, the inlet valves. The other intermediate member is the lever 15 pivoted at 16, its free end 17 lying within the fork of lever 9 and being operated by a cam 18. That lever also has two extensions 19 for operating, say, the exhaust valve levers 5.

Preferably the bosses m for the spark plugs are also set radially in the head.

Figure 5:
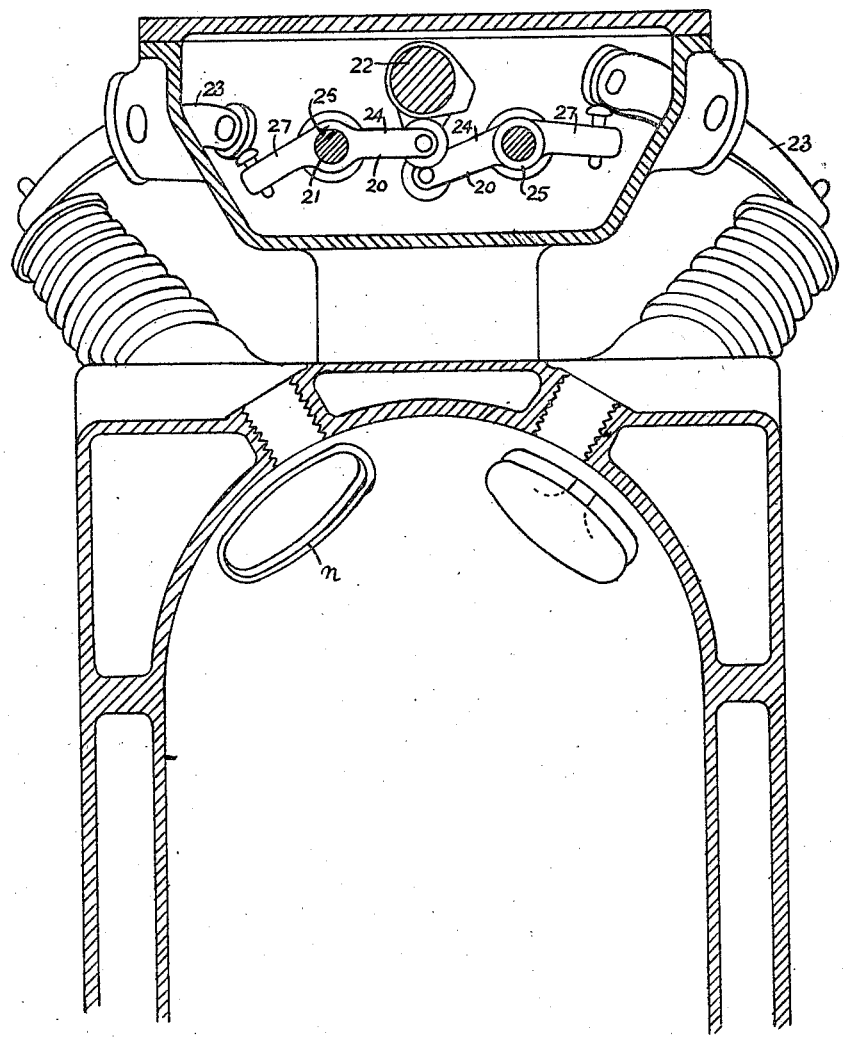

In the modifications shown in Figures 5 and 6 the head is made in one piece with the cylinder, and has no liner. In case, then, the metal of the head is not hard enough to form a satisfactory seating for the valve, a valve seat n of suitable metal may be cast or fitted around the valve opening.

The valve mechanism also is modified. In the modification shown in Figure 5, the intermediate levers 20 are alike, and their pivots 21 lie between their points of engagement with the cam shaft 22, and the valve rocking levers 23. There may again be two levers only, each comprising a single arm 24 co-acting with the cam shaft, a sleeve 25 upon the spindle 26, and two arms 27 for actuating the rocking levers 23. Or there may be separate cams and levers for each valve.

In the construction shown in Figure 6 the intermediate member is not a lever, but a slider 28 moving in a guide 29, and having arms or projections 30 for operating, in this case, two valve levers 31.

In all the constructions shown the cam shaft is placed above the cylinders and operates the intermediate member directly; but this is not necessary to the invention.

What I claim is:—

1. In an internal combustion engine the combination with the piston-swept cylinder of a substantially hemispherical head, a plurality of inlet valves and a plurality of outlet valves evenly spaced in said head with their stems substantially radial, a cam shaft, and operating mechanism connecting said valve stems with said cam shaft, said mechanism including a member for each valve moving in a plane containing the valve stem, and a second member operating the first and itself moving in a plane at right angles to the cam shaft.

2. In an internal combustion engine the combination with the piston-swept cylinder of a hemispherical combustion chamber, said chamber being formed of an outer casting and a thin inner liner having accurately machined and fitting hemispherical surfaces, in combination with a layer of jointing metal interposed between said surfaces and making good thermal contact between them.

3. In an internal combustion engine the combination with the cylinder, of a substantially hemispherical head of light metal closing the end of said cylinder, and a steel liner tinned on its outer surface, within and fitting said head and metallically continuous therewith.

4. In an internal combustion engine the combination with the cylinder of a substantially hemispherical head, valves moving radially in said head, a cam shaft with cams, valve rocking levers disposed each to rock in the plane of movement of one valve, and intermediate members, movable in a plane at right angles to the cam shaft, actuated by the cams and actuating said valve levers.

5. In an internal combustion engine the combination with the cylinder of a substantially hemispherical head, valves moving radially in said head, valve levers rocking in the plane of movement of said valves, a cam shaft with cams, and intermediate levers rocked by said cams in a plane at right angles thereto and actuating said valve levers.

6. In an internal combustion engine the combination with the cylinder of a substantially hemispherical head, four valves disposed symmetrically upon said head and moving radially therein, a cam shaft with cams disposed above said head, driving means therefor, valve levers each disposed to rock in the plane of movement of a valve, a forked intermediate lever actuated by said cams and actuating two of said valve levers, and a second intermediate lever, in line with the first, also actuated by said cams actuating the remaining two valve levers.

In testimony whereof I have signed my name to this specification.

ETTORE LANZEROTTI-SPINA.